United States Patent
Sweeting

(10) Patent No.: US 9,444,694 B1
(45) Date of Patent: Sep. 13, 2016

(54) VIRTUAL CLUSTERS TO PROVIDE FAULT CONTAINMENT

(71) Applicant: TIBCO Software Inc., Palo Alto, CA (US)

(72) Inventor: Steven Sweeting, Oakland, CA (US)

(73) Assignee: TIBCO Software Inc., Palo Alto, CA (US)

( * ) Notice: Subject to any disclaimer, the term of this patent is extended or adjusted under 35 U.S.C. 154(b) by 530 days.

(21) Appl. No.: 13/782,958

(22) Filed: Mar. 1, 2013

(51) Int. Cl.
  *G06F 15/173* (2006.01)
  *H04L 12/24* (2006.01)
  *H04L 29/08* (2006.01)

(52) U.S. Cl.
  CPC .............. *H04L 41/50* (2013.01); *H04L 67/16* (2013.01)

(58) Field of Classification Search
  CPC ...................................................... H04L 41/50
  See application file for complete search history.

(56) References Cited

U.S. PATENT DOCUMENTS

| | | | |
|---|---|---|---|
| 5,201,000 A * | 4/1993 | Matyas et al. | 380/30 |
| 7,321,926 B1 * | 1/2008 | Zhang et al. | 709/220 |
| 8,429,097 B1 * | 4/2013 | Sivasubramanian et al. | 706/12 |

* cited by examiner

*Primary Examiner* — Yves Dalencourt
(74) *Attorney, Agent, or Firm* — Van Pelt, Yi & James LLP

(57) ABSTRACT

Techniques to process service requests are described herein. In various embodiments, an identifier data associated with a service consumer with which a service request is associated is used to determine a subset comprising fewer than all members of a set of service instances. A selected service instance is selected from among the service instances in the subset to perform the service request.

16 Claims, 6 Drawing Sheets

US 9,444,694 B1

VIRTUAL CLUSTERS TO PROVIDE FAULT CONTAINMENT

BACKGROUND OF THE INVENTION

A major challenge with service-oriented architecture (SOA) based systems, or other systems in which the service requests of service consumers may be fulfilled by one or more of a plurality of instances of a service, is preventing a rouge or malformed consumer or request impacting service availability or performance of the service for other consumers. There are a variety of ways service consumers can cause problems either illicitly or more often accidentally. Malformed messages and increased message volume are two of the most common problems; these easily can overwhelm server components.

Load balancers typically handle increases in message volume by distributing requests across available servers. If this increase is still beyond what all instances can support availability and performance of the service to other consumers is adversely affected.

Consider also a malformed message which blocks or slows down a service component. Today's load balancers may retry a failed request against a second or third redundant service instance. Unfortunately this approach can cascade a failure across all services. The request that brings down one node is sent to the second node which brings that down and so on. One financial institution calculated that 90% of their service downtime one year was due to problems with single consumers. Sometimes it was a single request that broke a single instance causing it to go offline. The single request was resubmitted to active instances which in turn brought them down. Other times a consumer might have been misconfigured to send a unmanageable number of requests that were distributed across and overwhelmed all service instances simultaneously.

There are many products in the market that help with detection via known attack vectors such Denial of Service attacks and malformed XML requests. Generally, these require expensive continued communication between all load balancers, as well as separate configuration or logic for each specific vulnerability. Because of their propensity to failover to subsequent instances of the service, they also have difficulty with scenarios where requests or consumers bring down a service instance due to a defect in the service.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Limiting service consumer access to a specific subset of service instances is disclosed. Each consumer's requests are distributed among service instances comprising an associated subset of service instances. In various embodiments, the subset may be determined in advance or dynamically as requests are received, e.g., at a load balancer or other request routing node. Using this approach, if a service request from a particular service client is malformed, or otherwise causes service instances that attempt to fulfill the request to crash or otherwise become unavailable, then the effect is limited to service instances that are included in the subset made available to that service consumer.

Figure 1:
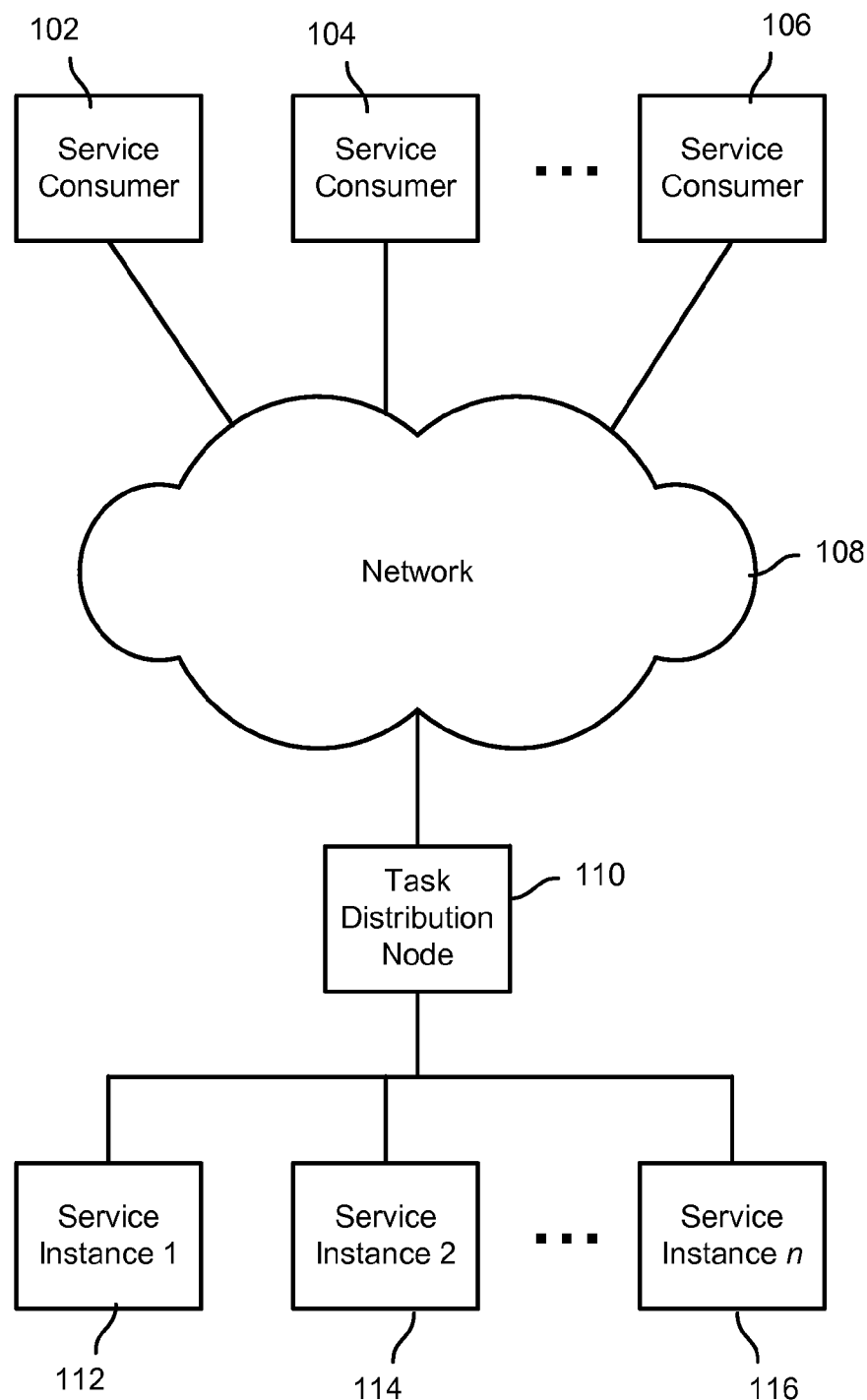
FIG. 1 is a block diagram illustrating an embodiment of a service-based system.

FIG. 1 is a block diagram illustrating an embodiment of a service-based system. In the example shown, service consumers represented by service consumers 102, 104, and 106 send service requests via network 108 to a task distribution node 110, such as a load balancer. In the typical prior art approach, the task distribution node 110 would direct each received request to an appropriate one of a plurality of service instances, represented in FIG. 1 by service instances 112, 114, and 116, which may comprise, for example, distinct physical systems and/or distinct logical instances of the service one or more of which may be running on a same physical machine. Applying techniques disclosed herein, by comparison, for a given request only a subset of the service instances represented by instances 112, 114, and 116 are eligible to be selected to service that request. For example, in some embodiments an attribute value, identifier, and/or other data associated with the service consumer that sent the request, such as the source IP address, is used to determine a subset of service instances associated with that service consumer. In some embodiments, the service consumer may be a web-based application, sending the request on behalf of a user of the web-based application. In some embodiments, an application identifier or other identifier associated uniquely with the application may be used to determine the subset of service instances from which a service instance to service a given request received from an application will be selected. The task distribution node 110 selects from the determined subset of eligible instances a service instance to perform the request.

Figure 2:
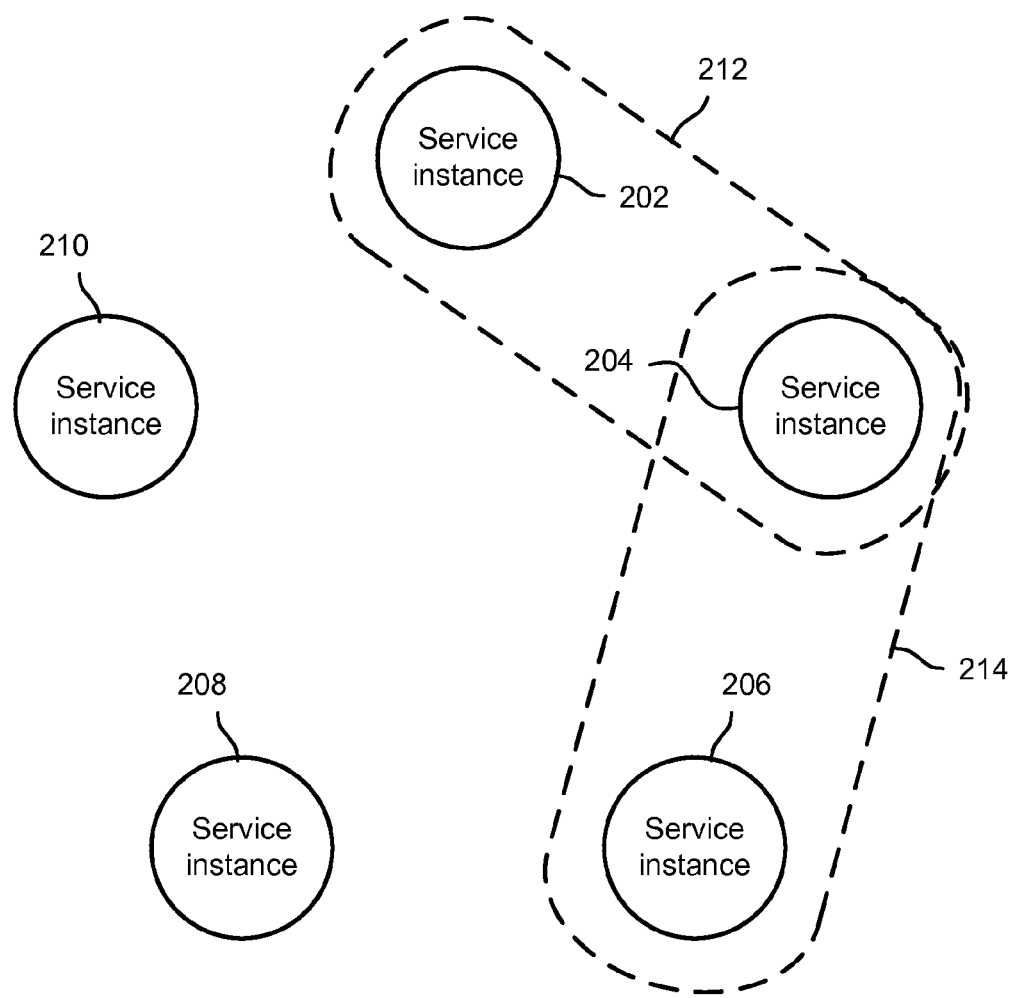
FIG. 2 is a block diagram illustrating an embodiment of a service-based system configured to contain faults.

FIG. 2 is a block diagram illustrating an embodiment of a service-based system configured to contain faults. In the example shown, service instances 202, 204, 206, 208, and 210 are available to service requests from service consumers. To contain faults, in this example a first subset of services instances 212, including in this example services instances 102 and 104, is defined and associated with a first set of one or more service consumers. A second subset of service instances 214 includes service instances 204 and 206, and is associated with a second set of one or more service consumers. Likewise, other combinations of two (or more or fewer) service instances may be associated with still other sets of one or more service consumers. In this way, for example, a malformed service request from a service consumer associated with the first subset of service instances 212 may cause service instances 202 and 204 to crash, but the remaining service instances will be unaffected. In the example shown, service consumers associated with the second subset 214 of service instances would still have service instance 206 available to service their requests.

Figure 3:
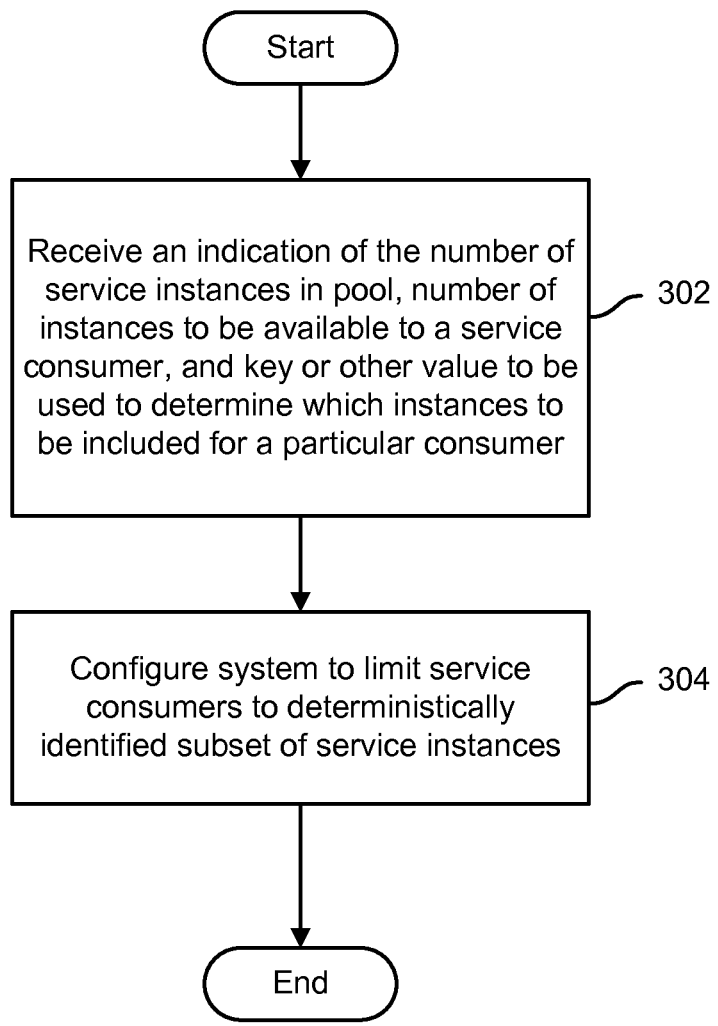
FIG. 3 is a flow chart illustrating an embodiment of a process to contain faults.

FIG. 3 is a flow chart illustrating an embodiment of a process to contain faults. In the example shown, an indication is received of (1) a number of service instances available to service requests, (2) a number of instances to be made available to a given service consumer, and (3) a key or other value to be used to determine which specific service instances are to be made available to a given service consumer (302). For example, an indication may be received that there are 100 service instances and that each service consumer should have access to 5 instances, based for example on the service requestor's IP address. In some embodiments, a more preferred service consumer may be allocated a larger number of service instances in the subset of service instances made available to service their requests than one or more other service consumers, rather than having the same number of service instance being included in every subset. The system is configured, e.g., at a load balancer or other task distribution node such as task distribution node 110 of FIG. 1, to limit each service consumer to a corresponding subset of service instances (304). In various embodiments, the subset of service instances available to service a given request is determined, e.g., dynamically at service request time, in a manner such that over time requests from the same service consumer will be routed to services instances selected from the same subset of service instances.

Figure 4:
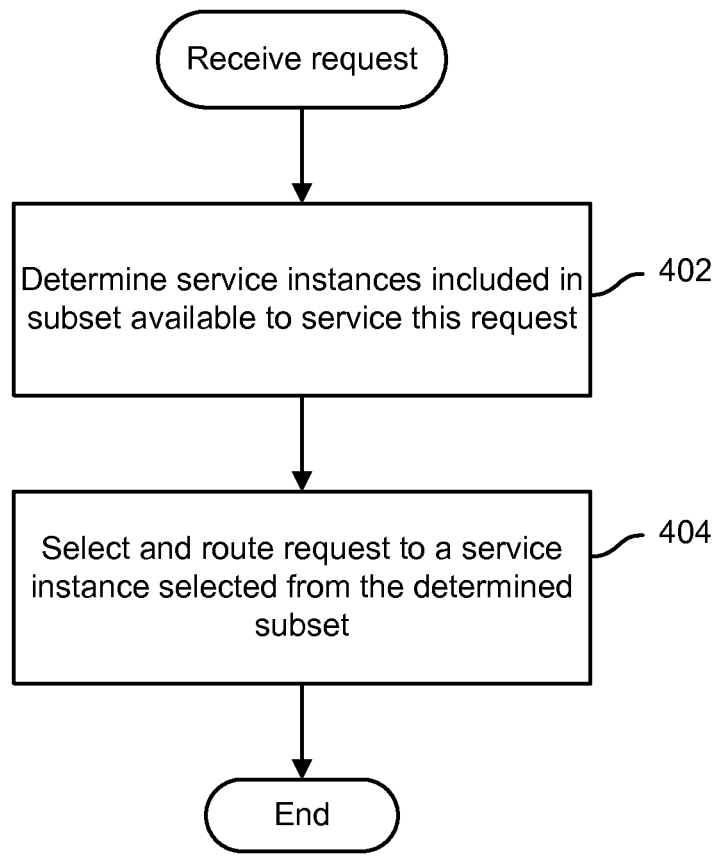
FIG. 4 is a flow chart illustrating an embodiment of a process to select a service request instance to service a request.

FIG. 4 is a flow chart illustrating an embodiment of a process to select a service request instance to service a request. In the example shown, when a service request is received, the service instances that are included in the subset of service instances available to be selected to perform the service request are determined (402). For example, the subset of service instances associated with a sender of the service requests, e.g., as indicated by source IP address, is used to determine the available subset. In some embodiments, the respective subsets may be computed in advance, and at service request time a lookup may be performed to identify the subset of service instances available to be selected from to determine a service instance to perform the request. A specific service instance to perform the request is selected from the determined subset and the request is routed to the selected instance for processing (404). In various embodiments, well known load balancing and/or other algorithms may be used to select a specific service instance from among the service instances in the subset of instances determined to be included in the subset of service instances eligible to be selected to service the request.

Figure 5:
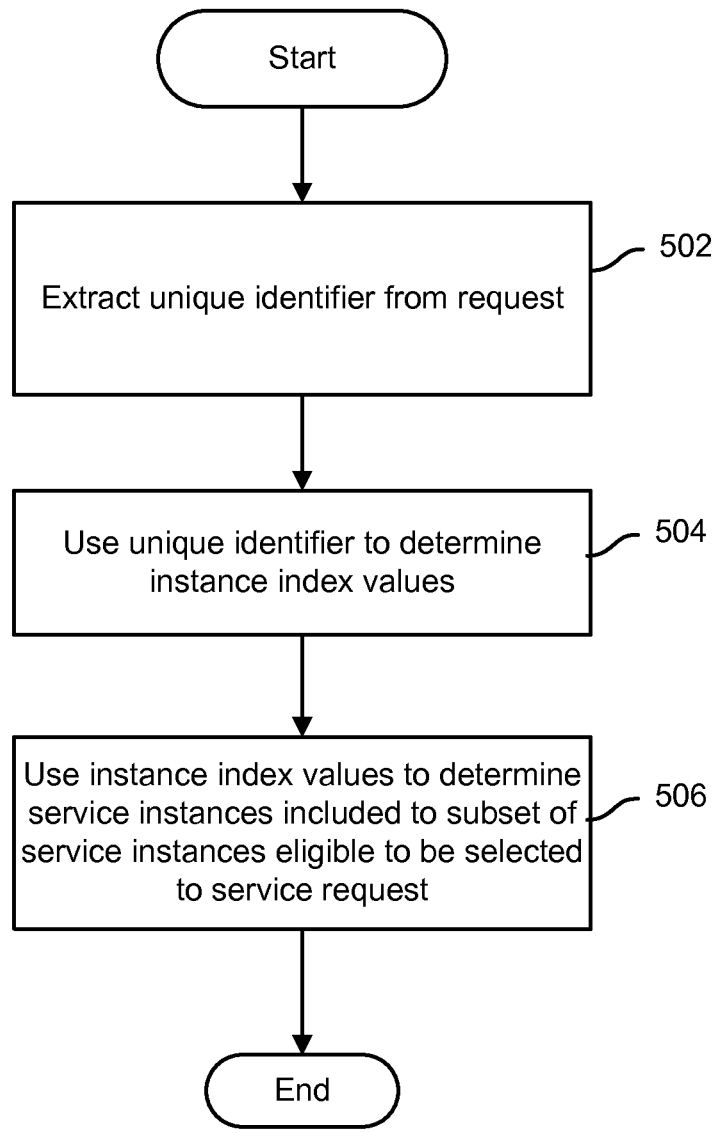
FIG. 5 is a flow chart illustrating an embodiment of a process determine a subset of service instances.

FIG. 5 is a flow chart illustrating an embodiment of a process determine a subset of service instances. In various embodiments, 402 of FIG. 4 includes the process of FIG. 5. In the example shown, a unique identifier is extracted from the service request (502). For example, in some embodiments, a source IP address, application identifier, or other unique identifier associated with the service consumer that sent the service request is extracted. The extracted unique identifier is used to determine service instance index values corresponding to service instances to be included in the subset (504). The service instance index values are used to determine the subset of service instances eligible to be selected to perform the service request (506).

In some embodiments, for example, the service consumer's IP address or another unique identifier may be used to compute a value, such as a hash, that in turn is used to seed a pseudorandom number generator. Values generated based on the seed would be used as or mapped to service instance index values of service instances to be included in the subset. Using the unique identifier as a seed in this way ensures the same subset of service instances will be determined for the same service consumer as subsequent requests are received, thereby ensuring that the effect of faults associated with a given service consumer and/or request are limited to the same subset of service instances.

In some embodiments, the subset of services associated with a service consumer may be determined in advance and cached or otherwise stored. At the time a request is received, an index is computed based on a unique identifier, and the index is used to perform a lookup to determine the subset of service instances available to be selected to perform the service request. In some embodiments, if a set of service instances associated with a given index is not found, a subset of service instances is determined dynamically, as described above. In some embodiments, the dynamically determined subset may be added to a cache or other store of previously-determined subsets.

Figure 6:
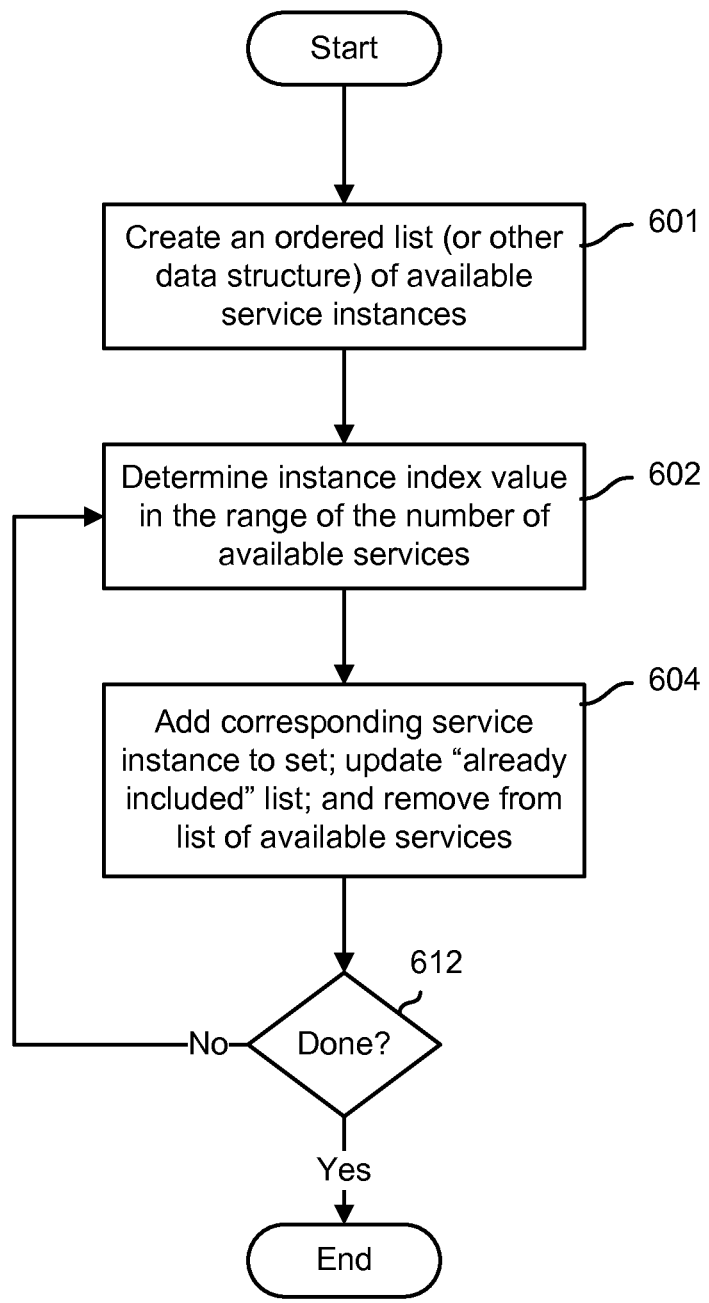
FIG. 6 is a flow chart illustrating an embodiment of a process to determine a subset of service instances.

FIG. 6 is a flow chart illustrating an embodiment of a process to determine a subset of service instances. Initially an ordered list (or other data structure) of available service instances is created (601). In the example shown, a first service instance index value is determined (602) in the range of the number of available service instances. A corresponding service instance is added to a subset of service instances associated with a service consumer and added to a list (or other data structure) of service instance index values that have already been added to the subset (604). The corresponding service is also removed from the initial list of available services reducing its size by one. A next service instance index value is received (or determined) (602) from the now available service instances. Processing continues until the subset has been populated with the prescribed number of service instances (612).

For example, when choosing 4 items from 100 the first item is selected from the pool of 100 items, the second from 99 items and so on. Consider the following example with the index values 55, 22, 55, 96 leading to a subset of items 55, 22, 57, 99.

| Range | Index | Available Pool | Select item | Subset |
|---|---|---|---|---|
| 0-99 | 55 | 0 . . . 99 | 55 (from 0 to 99) | 55 |
| 0-98 | 22 | 0 . . . 54, 56 . . . 99 | 22 (from 0 to 98) | 55, 22 |
| 0-97 | 55 | 0 . . . 21, 23 . . . 54, 56 . . . 99 | 57 (position 55) | 55, 22, 57 |
| 0-96 | 96 | 0 . . . 21, 23 . . . 54, 56, 58 . . . 99 | 99 (position 96) | 55, 22, 57, 99 |

In some embodiments, to minimize memory processing when an item is removed from the pool (e.g. 55), rather than higher items shuffling down, position 55 is replaced by the last item in the available pool. An associative array is used in some embodiments—e.g., to record that position 55 is now filled by "99". For example:

| Range | Index | Associative Array | Select item | Subset |
|---|---|---|---|---|
| 0-99 | 55 | | 55 | 55 |
| 0-98 | 22 | {55, 99} | 22 | 55, 22 |
| 0-97 | 55 | {55, 99}, {22, 98} | 99 (position 55) | 55, 22, 99 |
| 0-96 | 96 | {55, 97}, {22, 98} | 96 (position 96) | 55, 22, 99, 96 |

Note that this approach yields a different subset for the same input indices as first explored above. However, this approach still gives provably uniformly distinct subsets given uniformly distributed keys.

In another embodiment, appropriate for small subset sizes, a linear search of the subset determined so far is made, alleviating the need to build an associative array. For example, referring to the third row of the table above, with the second occurrence of index 55 a linear search through the partial subset would be performed to determine that 55 had already been chosen as position 1 (first row above). The index for the third position in this example would be generated using the formula (n—position already filled using this index), or 100-1, or 99.

In many embodiments, the algorithm to map a service consumer or other unique identifier to a corresponding subset of service instances finds for each unique identifier a corresponding ordered subset of service instances. While ordered subsets are used in various embodiments described herein, ordered subsets are not required. However, ordered subsets may in various embodiments be easier to derive from an input key.

A permutation is a particular arrangement of items. A set of 6 items can be arranged in 720 different permutations. For position 1 choose one of 6, for position 2 choose one of 5 left, for position 3 choose one of 4 and so on. The formula is thus 6*5*4*3*2 or 6 factorial.

n items can be arranged in n! ways

A kpermutation is an ordered subset of items. It is a set of k non-repeating items selected from a larger pool of n. From a pool of 6 three items can be arranged 120 different ways. For the first item choose one of 6, for the second, one of 5 and the third one of 4. The formula is 6*5*4 or 6 factorial divided by 4 factorial.

k ordered items from n can be arranged in $$\frac{n!}{(n-k)!}$$

way

A ksubset is an unordered subset of items, a unique combination of k non-repeating items from n. From a set of 6 items we can choose a 20 different subsets of three.

k items from n can be chosen in $$\frac{n!}{(n-k)! \times k!}$$

way.

To minimize overhead potentially on each request in various embodiments the load balancer or other task distribution node is configured to quickly determine the target instance or the set of target instances. To support arbitrarily large pool sizes, time and memory demands are O(n) or less in some embodiments.

In some embodiments, all unique combinations (ksubsets) are generated during initialization and then for each request a look up is performed to determine a particular combination using a modulus of the hashed key. Lookup time is O(1) but memory and setup time is $$O\left(\frac{n!}{(n-k)! \times k!}\right).$$

Selecting only 4 nom a pool of 100 requires calculating and storing almost 4 million unique combinations.

In some embodiments, an O(k) approach as described herein involves creating the subset of items (i.e., a subset of k items from a total set of n items) on demand.

In some embodiments, a single hash is used to deterministically generate a combination of items. That is, one number, rather than k numbers, is used. In some embodiments, this is accomplished by treating the hash (e.g., of the service consumer unique identifier or other identifier) as a concatenated key of k numbers.

While specific algorithms are described by way of example, in various embodiments one or more other and/or different algorithms may be used to determine a subset of service instances eligible to be selected to service a given service request. In various embodiments, an algorithm that is computationally efficient, given available resources, and which identifies the same subset of service instances (provided the overall set has not changed) for the same input (e.g., service consumer unique identifier and/or value computed based thereon) may be used.

In various embodiments, the task distribution node 110 of FIG. 1 may be duplicated for fault tolerance. Since in various embodiments the subset selection algorithm is stateless, these nodes do not need to communicate with each other.

Using techniques disclosed herein, the effects of a fault associated with a particular service request and/or service consumer may be contained to a subset of service instances, enabling other service instances not in the affected subset to remain available, e.g., to continue to service requests from other service consumers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing service requests, comprising:
receiving, at a load balancer or other service request distribution node, a service request;

extracting an identifier data from the service request, wherein the identifier data includes at least an Internet Protocol (IP) address associated with a service consumer;

using the identifier data associated with the service consumer with which the service request is associated to determine a total number of service instances of a set of service instances to be made available to service requests associated with the service consumer and to determine which service instances are to be included in a subset of service instances, wherein the subset comprises fewer than all members of the set of service instances and corresponds to the total number of service instances to be made available to service requests associated with the service consumer; and selecting from among the service instances in the subset a selected service instance to perform the service request.

2. The method of claim 1, wherein using the identifier data associated with the service consumer with which the service request is associated to determine which service instances are to be included in the subset of service instances includes computing a key based at least in part on the identifier data and using the key to look up one or more service instance index values associated with the key.

3. The method of claim 1, wherein using the identifier data associated with the service consumer with which the service request is associated to determine which service instances are to be included in the subset of service instances includes computing a key based at least in part on the identifier data and using the key to determine dynamically one or more service instance index values associated with the key.

4. The method of claim 3, wherein using the key to determine dynamically one or more service instance index values associated with the key includes using at least a portion of the key to generate a random number.

5. The method of claim 4, wherein using at least a portion of the key to generate a random number includes using said at least a portion of the key to seed a pseudorandom number generator.

6. The method of claim 1, wherein the subset includes a prescribed number k of service instances out of a broader population of n service instances.

7. The method of claim 1, wherein using the identifier data associated with the service consumer with which the service request is associated to determine which service instances are to be included in the subset comprising fewer than all members of the set of service instances is performed using an algorithm that ensures a same permutation of services instances is included in the subset as would have been determined for a prior service request, if any, from the same service consumer, absent changes in the set of service instances.

8. The method of claim 1, wherein using the identifier data associated with the service consumer with which the service request is associated to determine which service instances are to be included in the subset of service instances further includes iteratively choosing a service instance from an available pool of service instances that have not already been chosen to be included in the subset.

9. The method of claim 8, further comprising adding an index or other value associated with each service instance to be included in the subset to a list of service instances that have already been chosen to be included in the subset.

10. The method of claim 9, further comprising checking the list, for each iteration after a first iteration of choosing the service instance to be included in the subset, to determine whether the next selected service instance index or other value has already been included in the subset.

11. A service request distribution system, comprising:
a communication interface configured to receive data associated with a service request; and
a processor coupled to the communication interface and configured to:
extract an identifier data from the service request, wherein the identifier data includes at least an Internet Protocol (IP) address associated with a service consumer;
use the identifier data associated with the service consumer with which the service request is associated to determine a total number of service instances of a set of service instances to be made available to service requests associated with the service consumer and to determine which service instances are to be included in a subset of service instances, wherein the subset comprises fewer than all members of the set of service instances and corresponds to the total number of service instances to be made available to service the service request associated with the service consumer; and
select from among the service instances in the subset a selected service instance to perform the service request.

12. The system of claim 11, wherein the processor is configured to use the identifier data associated with the service consumer with which the service request is associated to determine which service instances are to be included in the subset of service instances at least in part by computing a key based at least in part on the identifier data and using the key to look up one or more service instance index values associated with the key.

13. The system of claim 11, wherein the processor is configured to use the identifier data associated with the service consumer with which the service request is associated to determine which service instances are to be included in the subset of service instances at least in part by computing a key based at least in part on the identifier data and using the key to determine dynamically one or more service instance index values associated with the key.

14. The system of claim 11, wherein the subset includes a prescribed number k of service instances out of a broader population of n service instances.

15. The system of claim 11, wherein the processor is configured to determine the subset comprising fewer than all members of the set of service instances at least in part by choosing, iteratively a service instance from an available pool of service instances that have not already been chosen to be included in the subset.

16. A computer program product to process service requests, the computer program product being embodied in a tangible, non-transitory computer readable storage medium and comprising computer instructions for:
receiving a service request;
extracting an identifier data from a service request, wherein the identifier data includes at least an Internet Protocol (IP) address associated with a service consumer;
using the identifier data associated with the service consumer with which the service request is associated to determine a total number of service instances of a set of service instances to be made available to service the service request associated with the service consumer and to determine which service instances are to be included in a subset of service instances, wherein the subset comprises fewer than all members of the set of service instances and corresponds to the total number of service instances to be made available to service the service request associated with the service consumer; and selecting from among the service instances in the subset a selected service instance to perform the service request.

* * * * *